United States Patent
Wu et al.

(10) Patent No.: US 10,334,010 B2
(45) Date of Patent: Jun. 25, 2019

(54) TRANSMISSION RATE DETERMINATION METHOD FOR STREAMING MEDIA AND SERVER

(71) Applicant: INDUSTRIAL TECHNOLOGY RESEARCH INSTITUTE, Hsinchu (TW)

(72) Inventors: Chun-Hsien Wu, Taichung (TW);
Chien-Peng Ho, Tainan (TW);
Ping-Lih Lin, Miaoli County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 238 days.

(21) Appl. No.: 15/388,910

(22) Filed: Dec. 22, 2016

(65) Prior Publication Data

US 2018/0152493 A1  May 31, 2018

(30) Foreign Application Priority Data

Nov. 25, 2016 (TW) .............................. 105139001 A (51) Int. Cl.
*H04L 12/00* (2006.01)
*H04L 29/06* (2006.01)
*H04L 29/08* (2006.01)

(52) U.S. Cl.
CPC .......... *H04L 65/601* (2013.01); *H04L 65/602* (2013.01); *H04L 65/80* (2013.01); *H04L 67/18* (2013.01); *H04L 67/327* (2013.01)

(58) Field of Classification Search
CPC ............ H04N 21/23406; H04L 65/601; H04L 65/602; H04L 67/327; H04L 67/18

(Continued)

(56) References Cited

U.S. PATENT DOCUMENTS 5,434,860 A * 7/1995 Riddle ................... H04L 47/10
370/232
6,160,545 A * 12/2000 Eyer .................. H04N 5/44543
348/569

(Continued)

FOREIGN PATENT DOCUMENTS

CN    102710963 A    10/2012
CN    105681552 A    6/2016

(Continued)

OTHER PUBLICATIONS

Office Action dated Jan. 18, 2018 in Taiwan application No. 105139001.

(Continued)

*Primary Examiner* — Frantz Coby
(74) *Attorney, Agent, or Firm* — Maschoff Brennan (57) ABSTRACT

A transmission rate determination method for streaming media is disclosed. The transmission rate determination method includes the following steps: collecting a location message, a time message, a communication parameter information and a transmission bit rate of a mobile device; updating a database of streaming throughput according to the location message, the time message, the communication parameter information and the transmission bit rate; wherein the database of streaming throughput includes information regarding a plurality of regions. The information of each of the plurality of regions includes an average transmission rate. The average transmission rate is related to the location message, the time message, the communication parameter information and the transmission bit rate.

12 Claims, 4 Drawing Sheets

(58) Field of Classification Search
USPC .................................................. 709/231, 232
See application file for complete search history.

(56) References Cited

U.S. PATENT DOCUMENTS

| | | | | |
|---|---|---|---|---|
| 6,647,389 | B1* | 11/2003 | Fitch | H04H 20/12 |
| 7,054,477 | B2* | 5/2006 | Hsu | G06K 9/3216 |
| | | | | 348/87 |
| 7,111,058 | B1* | 9/2006 | Nguyen | H04N 21/6377 |
| | | | | 375/E7.016 |
| 7,310,678 | B2* | 12/2007 | Gunaseelan | H04N 21/23406 |
| | | | | 348/E5.008 |
| 7,373,413 | B1* | 5/2008 | Nguyen | H04N 21/23406 |
| | | | | 370/231 |
| 7,391,717 | B2* | 6/2008 | Klemets | H04L 29/06 |
| | | | | 370/216 |
| 7,536,469 | B2* | 5/2009 | Chou | H04N 21/23406 |
| | | | | 709/231 |
| 7,783,773 | B2* | 8/2010 | Wu | H04L 65/80 |
| | | | | 709/203 |
| 8,099,755 | B2 | 1/2012 | Bajpai et al. | |
| 8,218,657 | B2* | 7/2012 | Spilo | H04L 1/0003 |
| | | | | 375/240.03 |
| 8,345,545 | B2* | 1/2013 | Kokku | H04L 47/10 |
| | | | | 370/229 |
| 8,812,673 | B2* | 8/2014 | Balachandran | H04L 47/10 |
| | | | | 709/226 |
| 9,106,887 | B1 | 8/2015 | Owen | |
| 9,246,842 | B2 | 1/2016 | Oyman et al. | |
| 9,723,451 | B2* | 8/2017 | Ljung | H04W 4/027 |
| 2003/0198184 | A1* | 10/2003 | Huang | H04L 1/0002 |
| | | | | 370/231 |
| 2005/0005020 | A1* | 1/2005 | Rey | H04L 1/0002 |
| | | | | 709/231 |
| 2009/0300698 | A1* | 12/2009 | Quigley | H04N 21/4126 |
| | | | | 725/114 |
| 2010/0124275 | A1 | 5/2010 | Yeh et al. | |
| 2012/0021372 | A1 | 1/2012 | Chen et al. | |
| 2012/0213272 | A1 | 8/2012 | Liu et al. | |
| 2012/0250762 | A1 | 10/2012 | Kaye et al. | |
| 2014/0256339 | A1* | 9/2014 | Lim | H04W 76/15 |
| | | | | 455/452.1 |
| 2016/0269802 | A1* | 9/2016 | Piraino | H04N 21/64322 |

FOREIGN PATENT DOCUMENTS

| | | |
|---|---|---|
| TW | 201038000 A | 10/2010 |
| TW | 201123828 A | 7/2011 |
| TW | I383684 B | 1/2013 |
| TW | M457361 U | 7/2013 |
| TW | 201503672 A | 1/2015 |

OTHER PUBLICATIONS

QoE assessment of multimedia video consumption on tablet devices, Floris et al.,IEEE, Dec. 3, 2012.
Almohamedh, Hamad, Fahad Al Qurashi, and Ivica Kostanic. "Mobile Video Quality Prediction (MVQP) for Long Term Evolution (LTE)." IAENG International Journal of Computer Science 42.1 (2015).
Afroz, Farhana, et al. "SINR, RSRP, RSSI and RSRQ Measurements in Long Term Evolution Networks." International Journal of Wireless & Mobile Networks (2015).
Seyedebrahimi, Mirghiasaldin, Xiao-Hong Peng, and Rob Harrison. "A quality driven framework for adaptive video streaming in mobile wireless networks." 2014 IEEE Wireless Communications and Networking Conference (WCNC). IEEE, 2014.
Riiser, Haakon, et al. "Video streaming using a location-based bandwidth-lookup service for bitrate planning." ACM Transactions on Multimedia Computing, Communications, and Applications (TOMM) 8.3 (2012): 24.
Lai, Wei-Kuang, Chih-Kun Tai, and Wei-Ming Su. "A Pre-scheduling mechanism in LTE handover for streaming video." Applied Sciences 6.3 (2016): 88.
Wang, Xiaofei, et al. "AMES-cloud: a framework of adaptive mobile video streaming and efficient social video sharing in the clouds." IEEE Transactions on Multimedia 15.4 (2013): 811-820.
Almohamedh, Hamad, Fahad Al Qurashi, and Ivica Kostanic. "Mobile Videos Quality Measurements for Long Term Evolution (LTE) Network." Proceedings of the International Conference on Image Processing, Computer Vision, and Pattern Recognition (IPCV). The Steering Committee of the World Congress in Computer Science, Computer Engineering and Applied Computing (WorldComp), 2014.
El Essaili, Ali, et al. "QoE-Based Cross-Layer Optimization for Uplink Video Transmission." ACM Transactions on Multimedia Computing, Communications, and Applications (TOMM) 12.1 (2015).

* cited by examiner

TRANSMISSION RATE DETERMINATION METHOD FOR STREAMING MEDIA AND SERVER

CROSS-REFERENCE TO RELATED APPLICATIONS

This non-provisional application claims priority under 35 U.S.C. § 119(a) on Patent Application No(s). 105139001 filed in Taiwan, R.O.C. on Nov. 25, 2016, the entire contents of which are hereby incorporated by reference.

TECHNICAL FIELD

The disclosure relates to a transmission rate determination method for streaming media and a server.

BACKGROUND

When the applications of mobile devices such as smart phones, tablet computers spread rapidly, users are able to use the mobile devices to upload the collected streaming media to media servers via internet. However, when the users in a moving state share the streaming media by their mobiles devices, it is difficult to maintain the fluency of the transmissions of streaming media because of the limitations of statuses of communications or internet, or speeds of mobile devices. As a result, the experiences of sharing streaming media are affected.

SUMMARY

A transmission rate determination method for streaming media is disclosed according to one embodiment of the present disclosure. The method includes the following steps: collecting a location message, a time message, communication parameter information and a transmission bit rate of a mobile device; updating a database of streaming throughput according to the location message, the time message, the communication parameter information and the transmission bit rate; wherein the database of streaming throughput includes information of a plurality of regions, the information of each of the plurality of regions includes an average transmission rate, the average transmission rate is related to the location message, the time message, the communication parameter information and the transmission bit rate.

A server is disclosed in the present disclosure. The server includes a storage medium and a processor. The storage medium stores a database of streaming throughput, wherein the database of streaming throughput includes information of a plurality of regions, the information of each of the plurality of regions includes an average transmission rate. The processor is configured to update the database of streaming throughput according to a location message, a time message, communication parameter information and a transmission bit rate when receiving the location message, the time message, the communication parameter information and the transmission bit rate. The average transmission rate is related to the location message, the time message, the communication parameter information and the transmission bit rate.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
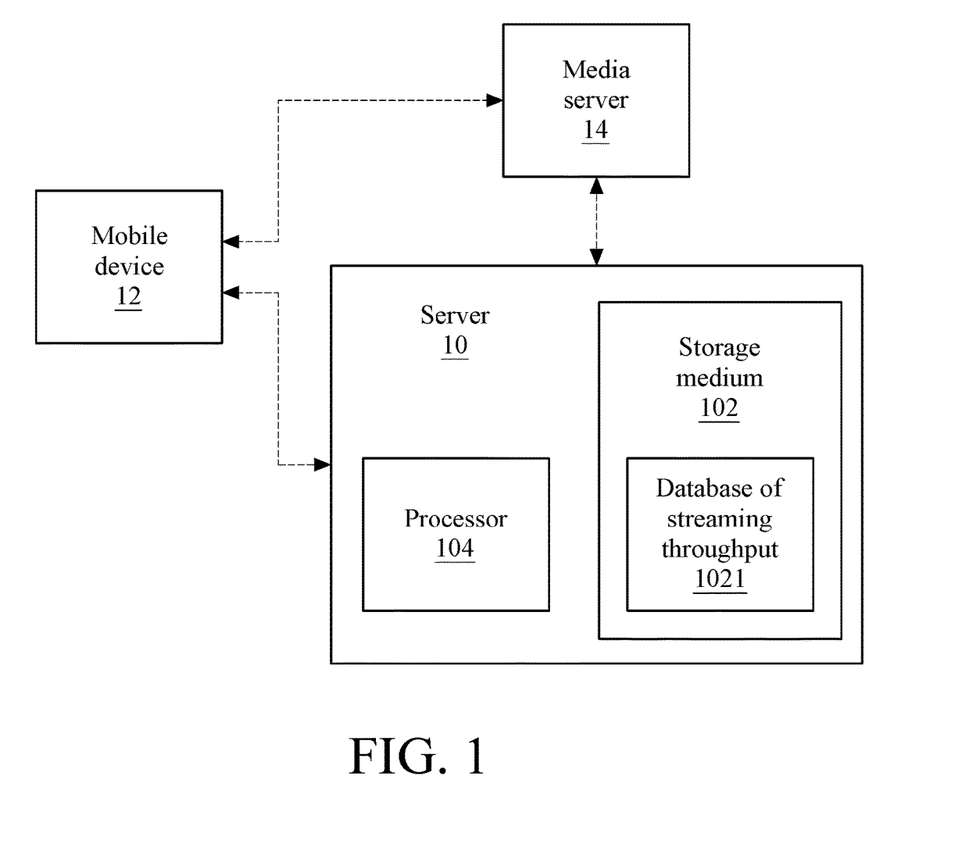
FIG. 1 is a block diagram of a server according to one embodiment of the present disclosure.

Please refer to FIG. 1 which is a block diagram of a server according to one embodiment of the present disclosure. As shown FIG. 1, a server 10 includes a storage medium 102 and a processor 104. The storage medium 102 stores a database of streaming throughput 1021. The processor 104 is configured to update the database of streaming throughput according to a location message, a time message, communication parameter information and a transmission bit rate of a mobile device 12 when receiving the location message, the time message, the communication parameter information and the transmission bit rate. In one example, the mobile device 12 is a portable device widely used such as a smart phone, a tablet, etc. In another example, the mobile device 12 is an embedded mobile device such as an industrial computer, a trip computer, etc. The mobile device 12 has one or more sensors configured to collect information related to the mobile device 12 such as the location message, the time message, the communication parameter information and the transmission bit rate. The processor 104 is configured to control the entire operation of the server 10. In one example, the processor 104 is a central processing unit (CPU), a programmable microprocessor, a digital signal processor (DSP), a programmable controller, an application specific integrated circuit (ASIC), a programmable logic device (PLD) or other device. The processor 104 in the present disclosure is not limited to the above embodiments. The storage medium 102 is a memory having the function of storage, such as a disc drive or a flash memory.

Figure 2A:
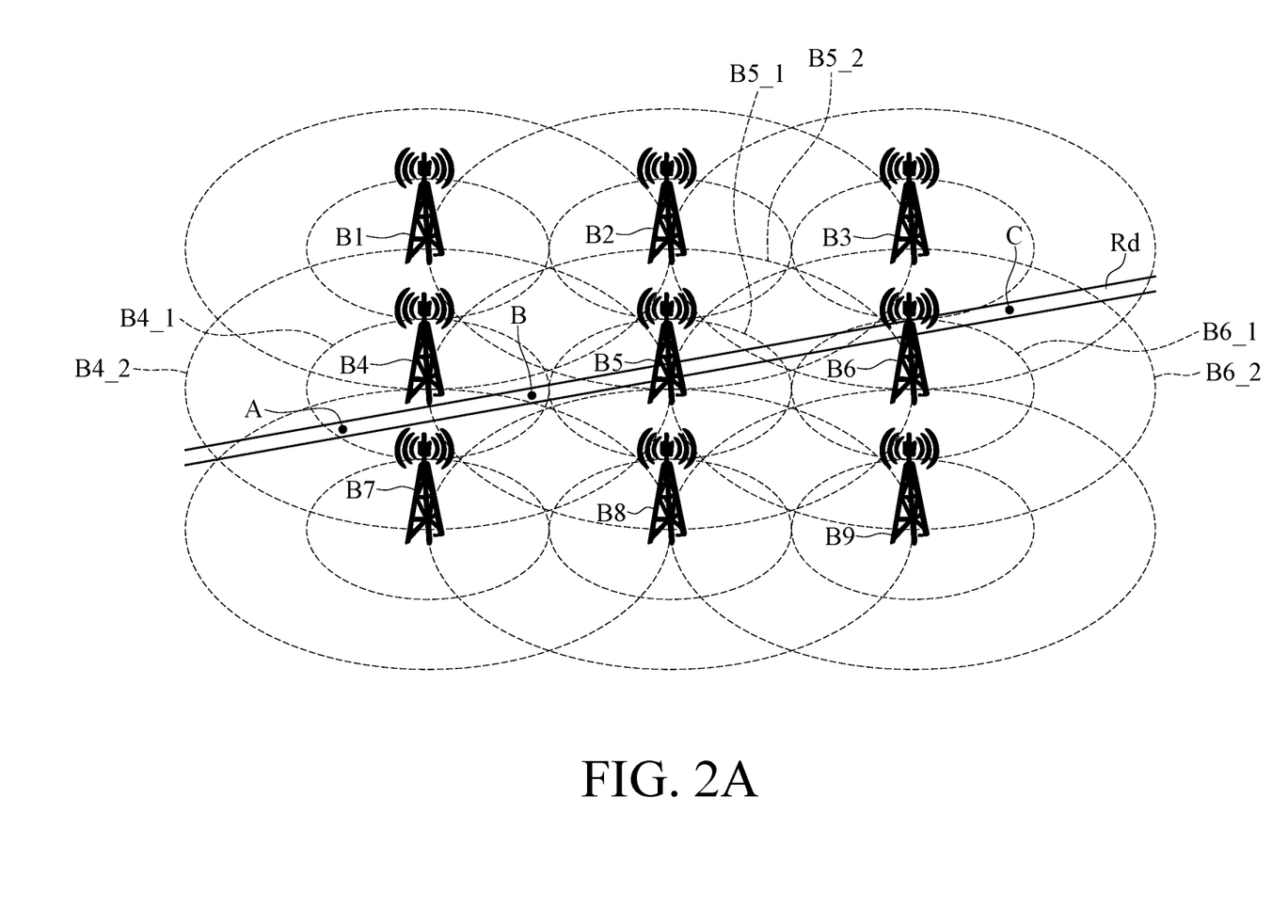
FIG. 2A is a schematic diagram of a route of the mobile device according to one embodiment of the present disclosure.

Please refer to FIG. 1 and FIG. 2A. FIG. 2A is a schematic diagram of a route of the mobile device according to one embodiment of the present disclosure. In the embodiment of FIG. 2A, the user carrying the mobile device 12 moves on the road Rd. The location message includes coordinates of the location of the mobile device 12. As shown in FIG. 2A, the cellular base stations B1 to B9 respectively corresponding to their own telecom operators were built around the road Rd. The cellular base stations B1 to B9 have their own coverage of signal. When the user carrying the mobile device 12 enters the coverage of signal of a cellular base station corresponding to one of telecom operators, the user is able to receive communication parameter information provided by the telecom operator. In one example, the communication parameter information is the type of mobile network (3G or 4G network), the reference signal receiving power (RSRP), the modulation and coding scheme (MCS), etc. In one example, the coverage of signal of each of the cellular base stations B1 to B9 includes two signal coverages respectively corresponding to two strength levels. Take the cellular base stations B4, B5 and B6 as examples. As shown in FIG. 2A, the cellular base station B4 has a first signal coverage B4_1 and a second signal coverage B4_2. The cellular base station B5 has a first signal coverage B5_1 and a second signal coverage B5_2. The cellular base station B6 has a first signal coverage B6_1 and a second signal coverage B6_2. The communication parameter information provided in the first signal coverage is different from the communication parameter information provided in the second signal coverage. For example, the mobile device 12 receives signals in form of 64-quadrature amplitude modulation (QAM) in the first signal coverage, and the mobile device 12 receives signals in form of 16-QAM in the second signal coverage.

Figure 2B:
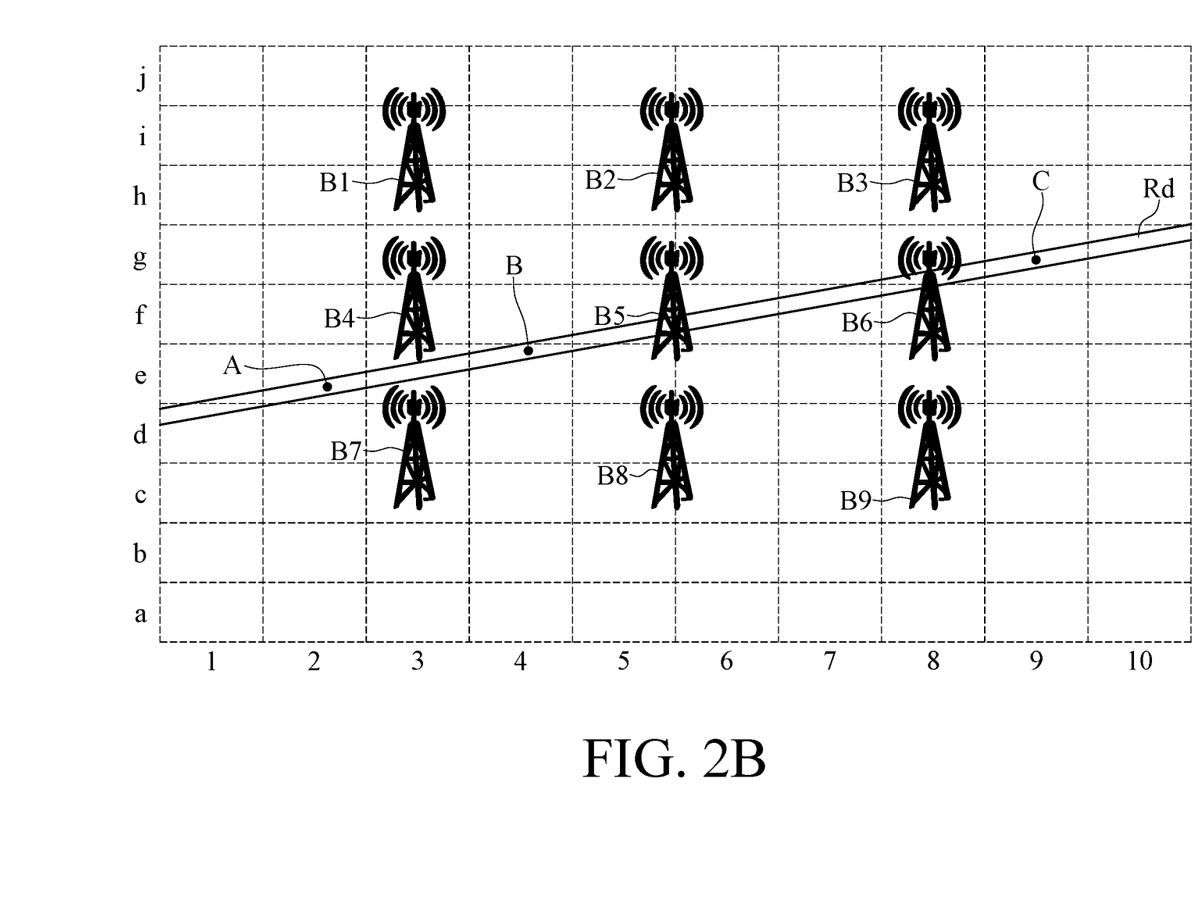
FIG. 2B is a schematic diagram of a route of the mobile device according to one embodiment of the present disclosure.

As shown in FIG. 2A, the mobile device 12 is within the signal coverages corresponding to the cellular base stations B4 and B7 when being on a location A. At this time, the sensors of the mobile device 12 collect the coordinates of the location A, the current time message, the communication parameter information of the cellular base station B4 or B7, as well as the transmission bit rate of the mobile device 12, and the mobile device 12 transmits the collected information to the server 10. The processor 104 in the server 10 further updates the database of streaming throughput 1021 according to the collected information. Specifically, please refer to FIG. 1, FIG. 2A and FIG. 2B. FIG. 2B is a schematic diagram of a route of the mobile device according to one embodiment of the present disclosure. In FIG. 2B, the schematic diagram of a route of the mobile device is divided into a plurality of rectangular regions according to the reference signs a to j of the vertical axis and the reference signs 1 to 10 of the horizontal axis. For example, the cellular base station B1 is located in a region h3, and the cellular base station B3 is located in a region h8. The database of streaming throughput 1021 includes information related to the regions shown in FIG. 2. Each region has its own index value. The aforementioned location A and the time T1 correspond to an index value. Therefore, the processor 104 finds out a region having the index value among the regions according to the index value corresponding to the region A and the time T. In the embodiment, the region having the index value is the region e2. The processor 104 further updates the information related to the region e2 according to the collected information. In one embodiment, the transmission bit rate of the mobile device 12 includes an uploading bit rate and a downloading bit rate. In another embodiment, the processor 104 updates the database of streaming transmission rate 1021 according to a speed of the mobile device 12. The speed is an average speed of the mobile device 12 moving a distance. In one example, the average speed of the mobile device 12 is derived from the location message and the time message. In another example, the average speed of the mobile device 12 is directly obtained by the speed sensors of the mobile device 12. The average speed changes in response to different time periods. For example, the average speed of the mobile device 12 is low since lots of vehicles are on the road Rd in the commuting time. On the contrary, the average speed of the mobile device 12 is high since the traffic is not busy in the lunch time.

In one embodiment, the processor 104 searches the database of streaming throughput 1021 to determine one of the regions according to the location message of the mobile device 12. The processor 104 further sends an average transmission bit rate of the determined region to the mobile device 12. The determined region corresponds to the location message of the mobile device 12. For example, the processor 104 receives a location message of the mobile device 12 when the mobile device 12 moves to the location B. In the example, the location message is the coordinates of the location B. The processor 104 searches the database of streaming throughput 1021 according to the coordinates of the location B. More specifically, according to an index value corresponding to the location B, the processor 104 finds out a region having the index value corresponding to the location B. In the example, the region that the processor 104 finds out is the region e4 shown in FIG. 2B. Please further refer to table 1 which is a lookup table corresponding to the region e4 in one embodiment of the present disclosure. The table 1 includes a plurality of telecom operators com1 to com4, as well as average transmission bit rates ABR1 to ABR12 corresponding to speed ranges V1 to V3. In the embodiment, the processor 104 further sends the table 1 corresponding to the region e4 to a streaming media transmitting terminal. In the embodiment, the streaming media transmitting terminal is the mobile device 12. The mobile device 12 searches for the average transmission bit rate according to the speed range and the telecom operator corresponding to the mobile device 12 in the table 1.

In the embodiment, the speed of the mobile device 12 is within the speed range V2 and corresponds to the telecom operator com2, so the mobile device 12 obtains the average transmission bit rate ABR5. The speed range is a section of speed. For example, the speed range V1 covers the speed which is less than or equal to 20 kilometers per hour. The speed range V2 covers the speed which is greater than 20 kilometers per hour and less than or equal to 40 kilometers per hour. The speed range V3 covers the speed which is greater than 40 kilometers per hour and less than or equal to 60 kilometers per hour.

TABLE 1

| region e4 | speed range V1 | speed range V2 | speed range V3 |
|---|---|---|---|
| telecom operator com1 | average transmission bit rate ABR1 | average transmission bit rate ABR2 | average transmission bit rate ABR3 |
| telecom operator com2 | average transmission bit rate ABR4 | average transmission bit rate ABR5 | average transmission bit rate ABR6 |
| telecom operator com3 | average transmission bit rate ABR7 | average transmission bit rate ABR8 | average transmission bit rate ABR9 |
| telecom operator com4 | average transmission bit rate ABR10 | average transmission bit rate ABR11 | average transmission bit rate ABR12 |

The speed range and the average transmission bit rate corresponding to one time period are shown in the table 1. However, the average transmission bit rate may change in condition of the same speeds and different time periods. For example, the average transmission bit rate obtained by the mobile device 12 during the work hours is different from the average transmission bit rate obtained by the mobile device 12 at midnight. For example, please refer to table 2 which is a lookup table corresponding to the region e4 in one embodiment of the present disclosure. Assume that the table 1 represents the lookup table corresponding to the first time period. The table 2 represents the lookup table corresponding to the second time period. The table 2 includes average transmission bit rates ABR13 to ABR24. As shown in table 1 and table 2, in condition of the same speed ranges and telecom operators, the average transmission bit rate obtained by the mobile device 12 in the first time period is different from the average transmission bit rate obtained by the mobile device 12 in the second time period.

TABLE 2

| region e4 | speed range V1 | speed range V2 | speed range V3 |
|---|---|---|---|
| telecom operator com1 | average transmission bit rate ABR13 | average transmission bit rate ABR14 | average transmission bit rate ABR15 |
| telecom operator com2 | average transmission bit rate ABR16 | average transmission bit rate ABR17 | average transmission bit rate ABR18 |
| telecom operator com3 | average transmission bit rate ABR19 | average transmission bit rate ABR20 | average transmission bit rate ABR21 |
| telecom operator com4 | average transmission bit rate ABR22 | average transmission bit rate ABR23 | average transmission bit rate ABR24 |

In the aforementioned embodiment, the processor 104 sends the table 1 to the mobile device 12 according to the location message of the mobile device 12. In another embodiment, the processor 104 sends the table 1 to the mobile device 12 according to the speed range corresponding to the speed of the mobile device 12. In this embodiment, the table 1 includes telecom operators com1 to com4, as well as the average transmission bit rates corresponding to the speed range. For example, the speed of mobile device 12 obtained by the processor 104 corresponds to the speed range V3. In this example, the table 1 was sent from the processor 104 to mobile device 12, wherein the table 1 includes the average transmission bit rate ABR3, ABR6, ABR9, ABR12 respectively corresponding to telecom operators com1 to com4 in the speed range V3. In this case, the mobile device 12 is capable of obtaining the average transmission bit rate according to its telecom operator. In this embodiment, if the mobile device 12 corresponds to the telecom operator com4, then the mobile device 12 obtains the average transmission bit rate ABR12.

In another embodiment, the mobile device 12 corresponds to a single telecom operator only. In this embodiment, the mobile device 12 requests a lookup table from the server 10 according to the location message and the communication parameter information provided by the single telecom operator. In this case, the lookup table includes the average transmission bit rates of the single telecom operator respectively corresponding to different speed ranges. For example, please refer to table 3 which is a lookup table corresponding to the region e4 in another embodiment of the present disclosure. In this embodiment, the mobile device 12 corresponds to the telecom operator com4 only. In this case, the table 3 obtained by the mobile device 12 includes the average transmission bit rates ABR10 to ABR 12 of the telecom operator com4 corresponding to the speed range V1 to V3.

TABLE 3

| region e4 | speed range V1 | speed range V2 | speed range V3 |
|---|---|---|---|
| telecom operator com4 | average transmission bit rate ABR10 | average transmission bit rate ABR11 | average transmission bit rate ABR12 |

In practice, the mobile device 12 has an encoder including a coding parameter. The mobile device 12 sends streaming media to the media server 14 based on the settings of the coding parameter. In one example, the media server 14 is a website offering media services. Users are able to upload or download a variety of streaming media via the media server 14. In the above embodiment, after the mobile device 12 obtains an average transmission bit rate as receiving the lookup table from the processor 104, the mobile device 12 adjusts the coding parameter of the encoder according to the average transmission bit rate. The mobile device 12 further transmits streaming media according to the adjusted coding parameter. Therefore, the users are able to upload the streaming media to the media server 14 based on the settings of the coding parameter of the mobile device 12.

The aforementioned embodiments are applied to a situation that routes are planned in advance by the users. In one example, the route is planned by a navigation system. In other words, in this case, the mobile device 12 has obtained the future paths of the mobile device 12 in advance, so that the processor 104 is capable of sending the average transmission bit rate to the mobile device 12 in advance according to the next location of the mobile device 12 for adjusting the coding parameter. For example, as shown in FIG. 2B, the user is on the location A, and the route planned in advance is the path from the location A to the location C. In this condition, the server 10 searches the database of streaming transmission rate 1021 according to the path from the location A to the location C for finding out one or more regions corresponding to the path. In this example, those regions are regions e2, e3, e4, e5, f4, f5, f6, f7, f8, g7, g8 and g9 respectively. The processor 104 sends lookup tables corresponding to these regions to the mobile device 12, and thereby, the mobile device 12 obtains average transmission bit rates corresponding to these regions for adjusting the coding parameter of the encoder. Since the coding parameter has been adjusted in advance, the streaming media can be smoothly transmitted to the media server 14 when the user moves along the path from the location A to the location C in these regions.

In another embodiment, routes are not planned in advance by the user. Instead, the user moves randomly. For example, the user drives randomly without setting up a destination. In this case, it is impossible to predict the location or the region where the user moves next. Therefore, in this embodiment, the processor 104 searches the database of streaming throughput 1021 to determine one of the regions according to the location of the mobile device 12, and sends the average transmission bit rate of the determined region to the mobile device 12. The determined region is near to a location regarding the location message. Specifically, if the route is not planned in advance by the user, the processor 104 searches the database of streaming throughput 1021 according to the location of the mobile device 12, and sends the lookup tables respectively corresponding to regions near the location of the mobile device 12. For example, if the mobile device 12 is in location C, then the processor 104 sends the lookup tables respectively corresponding to regions (regions f8 to f10, regions g8 to g10 and regions h8 to h10), which are near to location C, to the mobile device 12. As a result, the coding parameter of the mobile device 12 has been adjusted to be the best values of transmissions rate corresponding to the regions near the location C, so the streaming media would be transmitted smoothly no matter which direction the user moves.

In the aforementioned embodiment, the streaming media transmitting terminal is the mobile device 12 capable of uploading streaming media to the media server 14. In another embodiment, the streaming media transmitting terminal is the media server 14. The mobile device 12 downloads the streaming media from the media server 14. In this embodiment, when the mobile device 12 downloads the streaming media, the media server 14 adjusts its own coding parameter according to the information related to a location message of the mobile device 12. Specifically, the media server 14 obtains the real-time location of the mobile device 12 for adjusting its own coding parameter so that the mobile device 12 is capable of receiving streaming media smoothly. When the mobile device 12 moves, the media server 14 adjusts its own coding parameter correspondingly. For example, the media server 14 correspondingly adjusts the resolutions of the streaming media according to traffic conditions or signal conditions regarding the location of the mobile device 12 so that the transmission of the streaming media is maintained in a condition of high quality.

Figure 3:
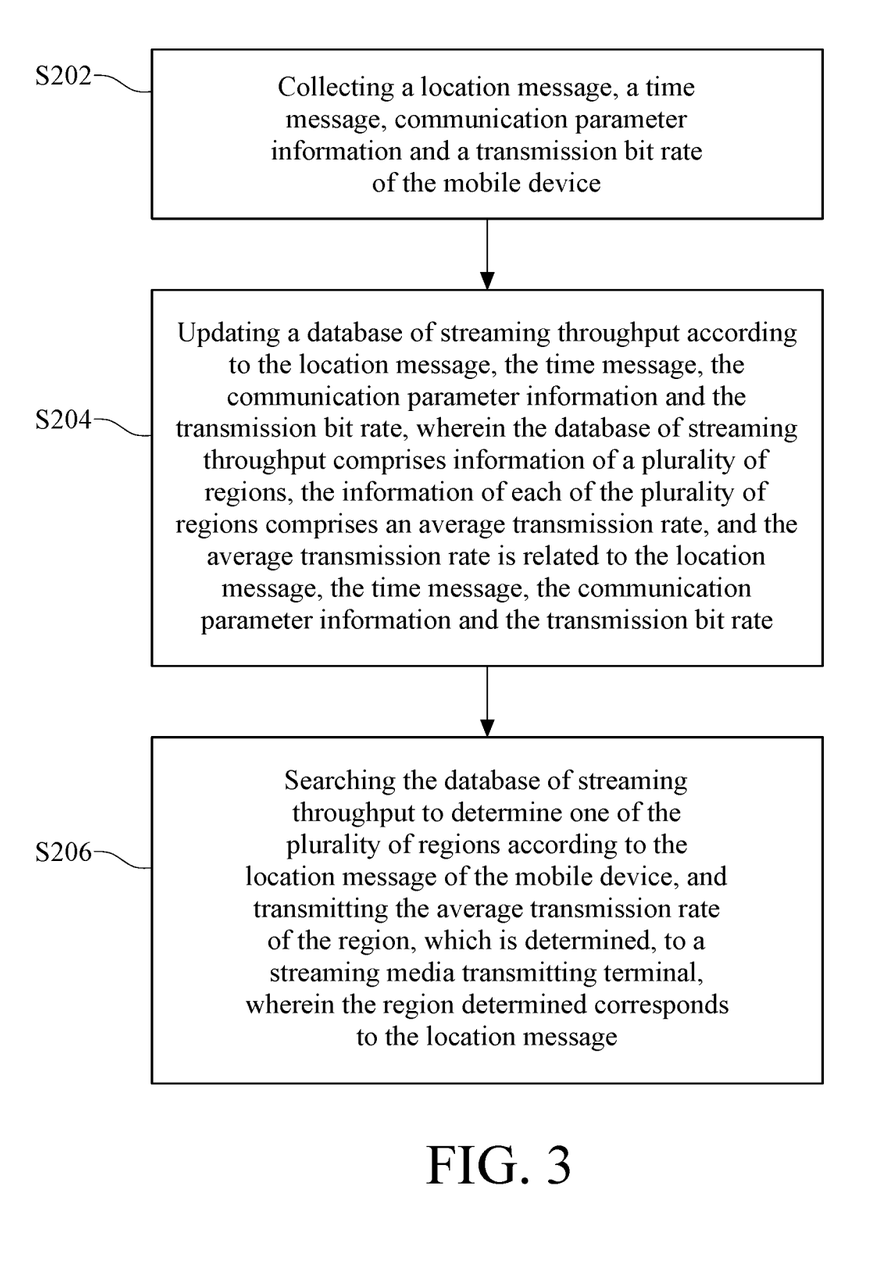
FIG. 3 is a flow chart of a transmission rate determination method for streaming media in one embodiment of the present disclosure.

Please refer to FIG. 3, which is a flow chart of a transmission rate determination method for streaming media in one embodiment of the present disclosure. As shown in FIG. 3, in step of S202, collect a location message, a time message, communication parameter information and a transmission bit rate of the mobile device 12. In step of S204, the processor 104 updates the database of streaming throughput 1021 according to the location message, the time message, the communication parameter information and the transmission bit rate. The database of streaming throughput 1021 includes information regarding a plurality of regions. Each of the plurality of regions includes an average transmission bit rate related to the location message, the time message, the communication parameter information and the transmission bit rate. One of calculation methods for the average transmission bit rate includes the following steps. In step 1, acquire information regarding the same region from the database of streaming throughput 1021. In step 2, divide the information into a plurality of groups according to telecom operators (obtained by communication parameter information), time periods, speed ranges. In step 3, calculate an average of the transmission bit rates in the same group to obtain the average transmission bit rate. The calculation method for the average could be achieved by using arithmetic mean, harmonic mean, weighted moving average (WMA) of statistics.

In one embodiment, the transmission rate determination method for streaming media further includes step S206. In step S206, the processor 104 searches the database of streaming throughput 1021 according to the location message of the mobile device 12 to determine one of the plurality of regions, and sends an average transmission bit rate of the determined region to a streaming media transmitting terminal. In this embodiment, the streaming media transmitting terminal is the mobile device 12. The determined region corresponds to the location message. In another embodiment, the processor 104 searches the database of streaming throughput 1021 according to the location message of the mobile device 12 to determine one of the plurality of regions, and sends an average transmission bit rate of the determined region to the mobile device 12. In this embodiment, the determined region is near to a location regarding the location message.

In one embodiment, the step of searching the database of streaming throughput to determine one of the plurality of regions according to the location message of the mobile device 12 includes the following step: the processor 104 searches the database of streaming throughput 1021 to determine one of the regions according to an index value corresponding to the location message of the mobile device 12. In this embodiment, the determined region has the index value. For example, the location message of the mobile device 12 includes coordinates (100.102, 15.315), and the index value of the location message is (100, 15). In this case, the processor 104 searches for the region having the index value (100,15) among these regions, and sends the average transmission bit rate corresponding to the searched region having the index value (100,15) to the mobile device 12. In the above embodiment, the coordinates of the location message and its index value are used for illustrating. Coordinates of a location message and index values of the present disclosure are not limited to the above embodiment. In another embodiment, the mobile device 12 has coding parameters used for transmitting streaming media. The mobile device 12 adjusts the coding parameters according to the average transmission bit rate, and transmit the real-time streaming medium according to the adjusted coding parameters.

Based on the above descriptions, in the transmission rate determination method for streaming media and the operations of the server, the location message, the time message and the communication parameter information and the transmission bit rate are collected to update the database of streaming throughput in the server. The processor in the server searches the database of streaming throughput according to the location of the mobile device for transmitting an average transmission bit rate to the streaming media transmitting terminal. Thereby, the streaming media transmitting terminal is capable of adjusting the coding parameter to raise the transmission qualities of streaming media.

What is claimed is:

1. A transmission rate determination method for streaming media, comprising:

collecting a location message, a time message, communication parameter information and a transmission bit rate of a mobile device;

updating a database of streaming throughput according to the location message, the time message, the communication parameter information and the transmission bit rate, wherein the database of streaming throughput comprises information of a plurality of regions, the information of each of the plurality of regions comprises an average transmission rate, and the average transmission rate is related to the location message, the time message, the communication parameter information and the transmission bit rate;

searching the database of streaming throughput to determine one of the plurality of regions according to the location message of the mobile device;

selecting the average transmission rate of the region which is determined according to one of a plurality of time periods of one day and a speed range corresponding to a speed of the mobile device; and transmitting the average transmission rate of the region, which is determined, to a streaming media transmitting terminal for transmitting a real-time streaming medium based on the average transmission rate, wherein the determined region corresponds to the location message.

2. The transmission rate determination method for streaming media according to claim 1, wherein the streaming media transmitting terminal has a coding parameter configured to transmit a real-time streaming medium and the streaming media transmitting terminal adjusts the coding parameter according to the average transmission rate and transmits the real-time streaming medium according to the adjusted coding parameter.

3. The transmission rate determination method for streaming media according to claim 1, wherein the searching the database of streaming throughput to determine one of the plurality of regions comprises:
   searching the database of streaming throughput to determine one of the plurality of regions according to an index value corresponding to the location message of the mobile device, wherein the determined region has the index value.

4. The transmission rate determination method for streaming media according to claim 1, further comprising:
   searching the database of streaming throughput to determine another of the plurality of regions; and
   transmitting the average transmission rate of the another region, which is determined, to a streaming media transmitting terminal, wherein the determined another region is near a location regarding the location message.

5. The transmission rate determination method for streaming media according to claim 1, further comprising:
   updating the database of streaming throughput according to the speed of the mobile device.

6. The transmission rate determination method for streaming media according to claim 1, wherein the transmission bit rate comprises an uploading bit rate and a downloading bit rate.

7. A server, comprising:
   a storage medium storing a database of streaming throughput, wherein the database of streaming throughput comprises information of a plurality of regions, and the information of each of the plurality of regions comprises an average transmission rate; and
   a processor configured to update the database of streaming throughput according to a location message, a time message, communication parameter information and a transmission bit rate of a mobile device when receiving the location message, the time message, the communication parameter information and the transmission bit rate, the processor being further configured to search the database of streaming throughput to determine one of the plurality of regions according to the location message of the mobile device, and to select the average transmission rate of the region which is determined according to one of a plurality of time periods of one day and a speed range corresponding to a speed of the mobile device and transmit the average transmission rate of the region, which is determined, to a streaming media transmitting terminal for transmitting a real-time streaming medium based on the average transmission rate, wherein the determined region corresponds to the location message;
   wherein the average transmission rate is related to the location message, the time message, the communication parameter information and the transmission bit rate.

8. The server according to claim 7, wherein the streaming media transmitting terminal has a coding parameter configured to transmit a real-time streaming medium, and the streaming media transmitting terminal adjusts the coding parameter according to the average transmission rate and transmits the real-time streaming medium according to the adjusted coding parameter.

9. The server according to claim 7, wherein the location message of the mobile device corresponds to an index value, and the server searches the database of streaming throughput to determine one of the plurality of regions, wherein the determined region has the index value.

10. The server according to claim 7, wherein the processor is further configured to search the database of streaming throughput to determine another of the plurality of regions according to the location message of the mobile device and transmit the average transmission rate of the another region, which is determined, to a streaming media transmitting terminal, wherein the determined another region is near a location regarding the location message.

11. The server according to claim 7, wherein the processor is further configured to update the database of streaming throughput according to the speed of the mobile device.

12. The server according to claim 7, wherein the transmission bit rate comprises an uploading bit rate and a downloading bit rate.

* * * * *